(12) United States Patent
Mahgerefteh et al.

(10) Patent No.: US 8,260,150 B2
(45) Date of Patent: Sep. 4, 2012

(54) PASSIVE WAVE DIVISION MULTIPLEXED TRANSMITTER HAVING A DIRECTLY MODULATED LASER ARRAY

(75) Inventors: Daniel Mahgerefteh, Palo Alto, CA (US); Hongmin Chen, Waltham, MA (US); Bernd Huebner, Santa Clara, CA (US)

(73) Assignee: Finisar Corporation, Sunnyvale, CA (US)

( * ) Notice: Subject to any disclaimer, the term of this patent is extended or adjusted under 35 U.S.C. 154(b) by 1167 days.

(21) Appl. No.: 12/110,071

(22) Filed: Apr. 25, 2008

(65) Prior Publication Data

US 2009/0269069 A1    Oct. 29, 2009

(51) Int. Cl.
 *H04B 10/04* (2006.01)
(52) U.S. Cl. .......... 398/193; 398/183; 398/194; 398/79; 398/199; 398/201; 398/195; 398/196; 385/24; 385/37
(58) Field of Classification Search .................. 398/182, 398/183, 193, 157, 201, 147, 79, 81, 186, 398/187, 192, 194, 195, 196, 197, 33, 34, 398/38, 158, 159, 185, 199, 200, 91, 82, 398/161, 84, 85, 87; 385/24, 37, 15, 27
See application file for complete search history.

(56) References Cited

U.S. PATENT DOCUMENTS

| | | |
|---|---|---|
| 3,324,295 A | 6/1967 | Harris |
| 3,973,216 A | 8/1976 | Hughes et al. |
| 3,999,105 A | 12/1976 | Archey et al. |
| 4,038,600 A | 7/1977 | Thomas et al. |
| 4,561,119 A | 12/1985 | Epworth |
| 4,671,604 A | 6/1987 | Soref |
| 4,754,459 A | 6/1988 | Westbrook |
| 4,805,235 A | 2/1989 | Henmi |
| 4,841,519 A | 6/1989 | Nishio |
| 4,896,325 A | 1/1990 | Coldren |
| 4,908,833 A | 3/1990 | Chraplyvy et al. |
| 4,914,667 A | 4/1990 | Blonder et al. |
| 5,088,097 A | 2/1992 | Ono et al. |
| 5,119,393 A | 6/1992 | Oka et al. |
| 5,136,598 A | 8/1992 | Weller et al. |
| 5,170,402 A | 12/1992 | Ogita et al. |
| 5,177,630 A | 1/1993 | Goutzoulis et al. |

(Continued)

FOREIGN PATENT DOCUMENTS

CN    1236891    12/1999

(Continued)

OTHER PUBLICATIONS

Alexander et al., Passive Equalization of Semiconductor Diode Laser Frequency Modulation, Journal of Lightwave Technology, Jan. 1989, 11-23, vol. 7, No. 1.

(Continued)

*Primary Examiner* — Hanh Phan
(74) *Attorney, Agent, or Firm* — Maschoff Gilmore & Israelsen

(57) ABSTRACT

An wave division multiplexed (WDM) optical transmitter is disclosed including a directly modulated laser array and a planar lightwave chip (PLC) having a plurality of OSRs that receive outputs of the laser array and increase the extinction ratio of the received light. An optical multiplexer receives the outputs of the OSRs and couples them to a single output port. The multiplexer has transmission peaks through its ports each having a 0.5 dB bandwidth including the frequency of a laser in the array. The optical multiplexer may be embodied as cascaded Mach-Zehnder interferometers or ring resonators.

20 Claims, 4 Drawing Sheets

U.S. PATENT DOCUMENTS

| | | | |
|---|---|---|---|
| 5,293,545 A | 3/1994 | Huber | |
| 5,325,378 A | 6/1994 | Zorabedian | |
| 5,325,382 A | 6/1994 | Emura et al. | |
| 5,371,625 A | 12/1994 | Wedding et al. | |
| 5,373,383 A * | 12/1994 | LaGasse | 398/26 |
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A | 12/1997 | Onaka et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,096,496 A | 8/2000 | Frankel | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri | |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1 | 8/2001 | Logan et al. | |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks | |
| 6,359,716 B1 | 3/2002 | Taylor | |
| 6,421,151 B1 | 7/2002 | Berger | |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,690,686 B2 | 2/2004 | Delfyett | |
| 6,738,398 B2 | 5/2004 | Hirata | |
| 6,748,133 B2 | 6/2004 | Liu et al. | |
| 6,778,307 B2 | 8/2004 | Clark | |
| 6,785,308 B2 | 8/2004 | Dyer et al. | |
| 6,807,215 B2 | 10/2004 | Lam et al. | |
| 6,810,047 B2 | 10/2004 | Oh et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 | 4/2006 | May | |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati | |
| 7,356,264 B2 | 4/2008 | Mahgerefteh et al. | |
| 7,376,352 B2 | 5/2008 | Tayebati | |
| 7,406,266 B2 | 7/2008 | Mahgerefteh et al. | |
| 7,406,267 B2 | 7/2008 | Mahgerefteh et al. | |
| 7,433,605 B2 | 10/2008 | Mahgerefteh et al. | |
| 7,474,858 B2 | 1/2009 | Lee et al. | |
| 7,474,859 B2 | 1/2009 | Mahgerefteh et al. | |
| 7,477,851 B2 | 1/2009 | Mahgerefteh et al. | |
| 7,480,464 B2 * | 1/2009 | McCallion et al. | 398/201 |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 7/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 * | 12/2009 | Zheng et al. | 398/212 |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,860,404 B2 | 12/2010 | Matsui et al. | |
| 2001/0012430 A1 | 8/2001 | Usami et al. | |
| 2001/0048705 A1 | 12/2001 | Kitoka et al. | |
| 2002/0002099 A1 | 1/2002 | Hara et al. | |
| 2002/0012369 A1 | 1/2002 | Nasu et al. | |
| 2002/0025111 A1 * | 2/2002 | Koshi | 385/24 |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2002/0186730 A1 * | 12/2002 | Garbuzov | 372/36 |
| 2003/0002099 A1 | 1/2003 | Sayyah et al. | |
| 2003/0002120 A1 | 1/2003 | Choa | |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 | 8/2003 | Kang et al. | |
| 2003/0161370 A1 | 8/2003 | Buimovich et al. | |
| 2003/0169787 A1 | 9/2003 | Vurgaftman et al. | |
| 2003/0193974 A1 | 10/2003 | Frankel et al. | |
| 2003/0210912 A1 | 11/2003 | Leuthold | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |
| 2004/0208644 A1 * | 10/2004 | Sirat et al. | 398/186 |
| 2004/0218890 A1 | 11/2004 | Mahgerefteh et al. | |
| 2004/0234200 A1 | 11/2004 | Jennings et al. | |
| 2005/0100345 A1 | 5/2005 | Welch et al. | |
| 2005/0111852 A1 | 5/2005 | Mahgerefteh et al. | |
| 2005/0129402 A1 * | 6/2005 | Kim et al. | 398/79 |
| 2005/0152702 A1 | 7/2005 | Mahgerefteh et al. | |
| 2005/0163512 A1 | 7/2005 | Tayebati et al. | |
| 2005/0169638 A1 | 8/2005 | Tayebati et al. | |

| | | | |
|---|---|---|---|
| 2005/0169642 A1 | 8/2005 | Mahgerefteh et al. | |
| 2005/0175356 A1 | 8/2005 | McCallion et al. | |
| 2005/0196177 A1 | 9/2005 | Moran | |
| 2005/0206989 A1 | 9/2005 | Marsh | |
| 2005/0213993 A1 | 9/2005 | Kazemi-Nia et al. | |
| 2005/0271394 A1 | 12/2005 | Whiteaway et al. | |
| 2005/0286829 A1 | 12/2005 | Mahgerefteh et al. | |
| 2005/0286909 A1 | 12/2005 | Kish, Jr. et al. | |
| 2006/0002718 A1 | 1/2006 | Matsui et al. | |
| 2006/0008272 A1 | 1/2006 | Abeles et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0078338 A1 | 4/2006 | Johnson et al. | |
| 2006/0120416 A1 | 6/2006 | Hu et al. | |
| 2006/0177225 A1* | 8/2006 | Paraschis et al. | 398/87 |
| 2006/0193636 A1 | 8/2006 | Katagiri et al. | |
| 2006/0228120 A9 | 10/2006 | McCallion et al. | |
| 2006/0233556 A1 | 10/2006 | Mahgerefteh et al. | |
| 2006/0239306 A1 | 10/2006 | Donanhoe | |
| 2006/0274993 A1 | 12/2006 | Mahgerefteh et al. | |
| 2007/0110453 A1* | 5/2007 | Akiyama et al. | 398/182 |
| 2007/0286608 A1 | 12/2007 | Matsui et al. | |
| 2008/0002990 A1 | 1/2008 | McCallion et al. | |
| 2008/0037608 A1 | 2/2008 | Zhou et al. | |
| 2008/0159747 A1 | 7/2008 | Mahgerefteh et al. | |
| 2008/0166134 A1 | 7/2008 | McCallion et al. | |
| 2008/0181619 A1 | 7/2008 | Heismann | |
| 2008/0187325 A1 | 8/2008 | McCallion et al. | |
| 2008/0193132 A1 | 8/2008 | Matsui et al. | |
| 2008/0193143 A1* | 8/2008 | Mahgerefteh et al. | 398/183 |
| 2008/0193144 A1 | 8/2008 | Zhou et al. | |
| 2008/0240180 A1 | 10/2008 | Matsui et al. | |
| 2008/0247763 A1 | 10/2008 | Mahgerefteh et al. | |
| 2008/0247765 A1 | 10/2008 | Mahgerefteh et al. | |
| 2008/0291950 A1 | 11/2008 | McCallion et al. | |
| 2009/0003842 A1 | 1/2009 | Mahgerefteh et al. | |
| 2009/0060526 A1 | 3/2009 | Matsui et al. | |
| 2009/0080905 A1 | 3/2009 | Olsson | |
| 2009/0196631 A1 | 8/2009 | Daghighian et al. | |
| 2009/0238224 A1 | 9/2009 | Ye | |
| 2010/0008679 A1 | 1/2010 | Cole | |
| 2010/0098436 A1 | 4/2010 | Mahgerefteh et al. | |
| 2010/0254420 A1* | 10/2010 | Corzine et al. | 372/38.04 |
| 2010/0279447 A1 | 11/2010 | Matsui et al. | |
| 2010/0311195 A1 | 12/2010 | Matsui et al. | |

FOREIGN PATENT DOCUMENTS

| | | |
|---|---|---|
| EP | 0524758 | 7/1992 |
| EP | 602659 | 6/1994 |
| GB | 2 107 147 | 4/1983 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2001320328 | 11/2001 |
| JP | 2002243935 | 8/2002 |
| JP | 2002267834 | 9/2002 |
| JP | 2002267998 | 9/2002 |
| JP | 2002-311235 | 10/2002 |
| WO | 9905804 | 2/1999 |
| WO | 0104999 | 1/2001 |
| WO | 0117076 | 3/2001 |
| WO | 0118919 | 3/2001 |
| WO | 03005512 | 1/2003 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAl As Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

12126717 Office Action mailed Apr. 7, 2011.

Dischler et al., Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA, 2008.

Dong Jae Shin, et al., Low-cost WDM-PON with Colorless Bidirectional Tranceivers, Journal of Lightwave Technology, Jan. 2006, pp. 158-165, vol. 24, No. 1.

Freund et al, 30 Gbit/s RZ 8-PSK Transmission over 2800 km Standard Single Mode Fibre without Inline Dispersion Compensation, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Mahgerefteh et al., Chirp managed laser (CML): a compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Sekine, Kenro et al., Advanced Multi-level Transmission Systems, Optical Fiber Communication/National Fiber Optic Engineers Conference, Feb. 24-28, 2008, 3 pages, San Diego, CA.

"Tokle, Torger et al., Advanced Modulation Formats for Transmission Systems, Optical Fiber Communication/ National Fiber Optic Engineers Conference, Feb. 24-28, 2008, 3 pages, San Diego, CA."

Wesstrom et al., State-of-the-art performance of widely tunable modulated grating Y-branch lasers; Optical Fiber Communication Conference, 2004. OFC 2004, vol. 1, no., pp. 2 vol. (1800), Feb. 23-27, 2004; doi: 10.1109/OFC.2004.1349295.

CA 2510352 Office Action mailed Mar. 17, 2010.
CN 200380108289.9 Office Action mailed Nov. 23, 2007.
CN 200380108289.9 Office Action mailed Aug. 29, 2008.
CN 200380108289.9 Office Action mailed Nov. 21, 2008.
CN 200580012705.4 Office Action mailed Mar. 29, 2010.
CN 200580015245.0 Office Action mailed Sep. 25, 2009.
CN 200580015245.0 Office Action mailed Mar. 29, 2010.
CN 2005800378071 Office Action mailed May 27, 2010.
CN 200880009551.7 Office Action mailed Jul. 14, 2010.
EP 05731268.8 Office Action mailed Jan. 16, 2008.
EP 05731268.8 Office Action mailed May 12, 2010.
EP 05764209.2 Exam Report mailed Jun. 9, 2009.
JP2004-551835 Office Action mailed Jul. 18, 2008.
JP2004-551835 office Action mailed Mar. 2, 2010.
JP 2009-504345 Office Action mailed Apr. 27, 2010.
JP 2009-504345 Office Action mailed Oct. 26, 2010.
KR 102008-7027139 Office Action mailed Apr. 28, 2010.
U.S. Appl. No. 11/964,315 Office Action mailed Aug. 25, 2010.
U.S. Appl. No. 11/964,315 Notice of Allowance mailed Feb. 4, 2011.
U.S. Appl. No. 11/964,321 Office Action mailed Aug. 25, 2010.
U.S. Appl. No. 11/964,321 Notice of Allowance mailed Dec. 29, 2010.
U.S. Appl. No. 12/014,676 Office Action mailed Oct. 4, 2010.
U.S. Appl. No. 12/014,676 Notice of Allowance mailed Mar. 18, 2011.
U.S. Appl. No. 12/014,676 Supplemental Notice of Allowance mailed Jun. 29, 2011.
U.S. Appl. No. 12/017,957 Office Action mailed Nov. 5, 2010.
U.S. Appl. No. 12/017,957 Office Action mailed Apr. 25, 2011.
U.S. Appl. No. 12/025,573 Office Action mailed Oct. 6, 2010.
U.S. Appl. No. 12/025,573 Notice of Allowance mailed Feb. 7, 2011.
U.S. Appl. No. 12/028,675 Office Action mailed Oct. 27, 2010.
U.S. Appl. No. 12/028,675 Notice of Allowance mailed Mar. 24, 2011.
U.S. Appl. No. 12/028,678 Office Action mailed Dec. 8, 2010.
U.S. Appl. No. 12/028,678 Notice of Allowance mailed May 16, 2011.
U.S. Appl. No. 12/047,017 Restriction Requirement filed Jun. 1, 2010.
U.S. Appl. No. 12/047,017 Office Action mailed Aug. 6, 2010.
U.S. Appl. No. 12/047,017 Notice of Allowance mailed Sep. 27, 2010.
U.S. Appl. No. 12/053,344 Office Action mailed Apr. 1, 2010.
U.S. Appl. No. 12/053,344 Notice of Allowance mailed Sep. 3, 2010.
U.S. Appl. No. 12/115,337 Office Action mailed Mar. 4, 2010.
U.S. Appl. No. 12/115,337 Office Action mailed Aug. 20, 2010.
U.S. Appl. No. 12/115,337 Notice of Allowance mailed Oct. 28, 2010.
U.S. Appl. No. 12/184,137 Notice of Allowance mailed Dec. 2, 2010.

* cited by examiner

PASSIVE WAVE DIVISION MULTIPLEXED TRANSMITTER HAVING A DIRECTLY MODULATED LASER ARRAY

BACKGROUND OF THE INVENTION

1. The Field of the Invention

This application relates to fiber optic transmitters, and, more particularly to wave division multiplexed (WDM) transmitters.

2. The Relevant Technology

One means for increasing the capacity of a fiber optic network is to use wave division multiplexing (WDM) wherein optical signals having different wavelengths are transmitted simultaneously through the fiber. For example, the industry standard for the transmitter optical sub-assembly (TOSA) for 100 Gb/s Ethernet is expected to include wavelength division multiplexing of 4 transmitters at 25 Gb/s.

One proposed transmitter implementing this standard includes a co-package of an array of externally modulated lasers (EML), such as a monolithically integrated DFB laser and external electro-absorption modulator, a wave division multiplexer (WDM), an array of photodiodes, and output fiber coupling assembly. Other proposed transmitters include a directly modulated arrayed distributed feedback (DFB) laser.

Externally modulated lasers have the significant disadvantage of being bulky due to the requirement of both a laser and an external modulator. They further require more power inasmuch as both the laser and external modulator are powered. They also require a high degree of integration, which makes them difficult to manufacture with high yields. EML have been demonstrated at 40 Gb/s with extinction ratio>=10 dB and dispersion tolerance of ~40 ps/nm (Okayasu, M. et al, A 1550-nm 40-Gbit/s electro-absorption DFB laser diode module for transponders with very short reach (<2 km) applications, LEOS 2004, page: 513-514).

Directly modulated multi-wavelength integrated DFB laser arrays have been deployed widely as wavelength selective laser source, but the extinction ratio (ER) of most directly modulated lasers is less than 7 dB, which is less than the required ER for most applications. The highest ER reported for 40 Gb/s direct modulated DFB laser is 5 dB, Nakahara K., et al, "40-Gb/s direct modulation with high extinction ratio operation of 1.3-um InGaAlAs multiquantum well ridge waveguide distributed feedback lasers," IEEE Photonics Technology Letters, Vol. 19, October, 2007, pp. 1436-1438. Other directly modulated lasers provide better extinction ratios, however WDM system incorporating such lasers have not been demonstrated.

In view of the foregoing it would be an advancement in the art to provide a compact WDM transmitter using a directly modulated laser array that further provides an extinction ratio at least as high as 7 dB. It would be a further advancement in the art to provide such a transmitter that was readily manufacturable.

BRIEF SUMMARY OF THE INVENTION

In one aspect of the invention, an optical transmitter includes a laser array comprising a plurality of lasers each tuned to a unique frequency. A planar lightwave chip (PLC) abuts the laser array and includes a plurality of optical spectrum reshapers (OSRs) each positioned to receive light from one of the plurality of lasers and configured to enhance an extinction ratio of the received light. An optical multiplexer is optically coupled to each of the plurality of OSRs and has an output proximate a first edge of the PLC. The optical multiplexer has transmission peaks having a 0.5 dB bandwidth including the corresponding frequency of one of the plurality of lasers of the laser array.

In another aspect of the invention, the optical multiplexer has transmission peaks having a 0.5 dB bandwidth equal to between 25 and 45 percent, preferably at least 40 percent, of the separation between the transmission peaks.

In another aspect of the invention, each of the plurality of OSRs is adapted to transmit a portion of light received from the lasers of the laser array and to reject a portion. A first plurality of waveguides transmit at least a portion of the transmitted light to a second edge of the PLC and a second plurality of waveguides transmit at least a portion of the rejected light to a third edge of the PLC. A first array of photodetectors detect light from the first plurality of waveguides and a second array of photodetectors detect light from the second plurality of waveguides. A controller receives outputs from the first and second arrays of photodetectors and controls index of refraction adjusting elements coupled to each of the OSRs according to a ratio of the outputs at a predetermined ratio.

In another aspect of the invention the multiplexer is embodied as cascaded Mach-Zehnder interferometers or ring resonators.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
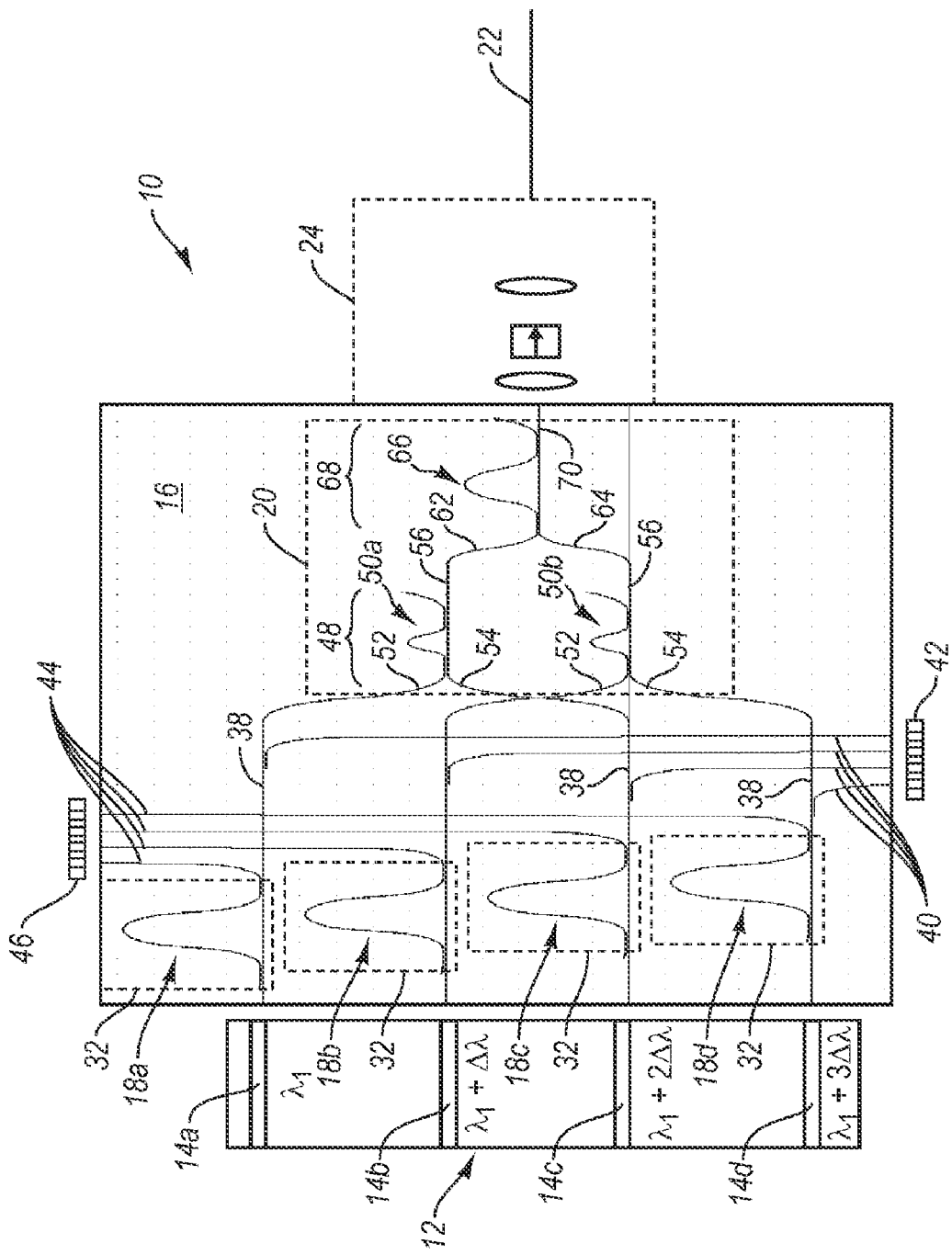
FIG. 1 illustrates a WDM transmitter having a laser array and planar lightwave circuit in accordance with an embodiment of the present invention.

Referring to FIG. 1, a laser transmitter 10 includes a laser array 12 including lasers 14a-14d each tuned to a different wavelength. The wavelength of each laser 14a-14d may be defined as a base or carrier frequency in embodiments where the lasers 14a-14d are frequency modulated or chirped. For example, in a preferred embodiment, the lasers 14a-14d are modulated with a data signal to produce an adiabatically chirped signal having both amplitude and frequency modulation encoding a data signal. The signal output by the lasers 14a-14d will include a base, or "zero-level," frequency with frequency excursions to a peak frequency encoding the data signal. In such embodiments the wavelength of each laser 14a-14d may be defined as either the base or peak frequency.

In a preferred embodiment, each laser 14a-14d has a nominal wavelength differing from each of the other lasers 14a-14d by an integer multiple of a wavelength difference $\Delta\lambda$. However, the wavelengths of the lasers 14a-14d may vary due to manufacturing limitations and may be independently tunable away from their nominal wavelengths such that the difference in wavelength between adjacent lasers 14a-14d is not necessarily equal to $\Delta\lambda$. In the illustrated embodiment, lasers 14a-14d have nominal wavelengths of $\lambda_1$, $\lambda_1+\Delta\lambda$, $\lambda_1+2\Delta\lambda$, and $\lambda_1+3\Delta\lambda$, respectively. In a preferred embodiment, the wavelengths of the lasers 14a-14d differ from their nominal wavelengths by no more than 20% of $\Delta\lambda$, more preferably by less than 10% of $\Delta\lambda$.

The relationship between amplitude modulation, frequency modulation and modulation current supplied to the lasers 14a-14d can be expressed by following rate equations (Sato K., et al, Chirp characteristics of 40-Gb/s directly modulated distributed-feedback laser diodes, Journal of lightwave technology, vol. 23, November 2005, pp. 3790-3797):

$$\frac{dN}{dt} = \frac{I}{qV} - \frac{N}{\tau_e} - v_g gS \qquad \text{(Eq. 1)}$$

$$\frac{dS}{dt} = \Gamma v_g gS - \frac{S}{\tau_p} - \frac{\Gamma R_{sp}}{V} \qquad \text{(Eq. 2)}$$

$$g = \frac{a(N-N_0)}{1+\varepsilon S} \qquad \text{(Eq. 3)}$$

$$\Delta v = \frac{1}{4\pi}\alpha \Gamma v_g a(N-N_{th}) \qquad \text{(Eq. 4)}$$

in which N is the carrier density, q is the electric charge of an electron, V is the volume of the active region, I is the injection current, $\tau_e$ is the lifetime of the carrier, $v_g$ is the group velocity of light, g is the gain, S is the photon number density in the cavity, $\Gamma$ is the optical confinement factor, Rsp is the rate of spontaneous emission, $N_0$ is the transparency carrier density, a is the differential gain coefficient, $\epsilon$ is the gain compression factor, $\Delta v$, which is also called chirp, is the deviation of laser frequency from the laser frequency at threshold, $N_{th}$ is the carrier density at threshold current, and $\alpha$ is the line-width enhancement factor. (Sato K., et al, Chirp characteristics of 40-Gb/s directly modulated distributed-feedback laser diodes, Journal of lightwave technology, vol. 23, November 2005, pp. 3790-3797):

| | | |
|---|---|---|
| V | 3.00E−17 | m$^3$ |
| $\Gamma$ | 0.2 | |
| A | 9.90E−20 | m$^2$ |
| $\epsilon$ | 2.77E−23 | m$^3$ |
| $\alpha$ | 3.5 | |
| Rsp | 1.18E+12 | 1/s |
| $\tau_e$ | 7.76E−10 | s |
| $\tau_p$ | 1.69E−12 | s |
| $v_g$ | 8.33E+07 | m/s |
| $N_0$ | 1.23E+24 | m$^{-3}$ |
| Q | 1.60E−19 | |

For a modulation current from 72 mA to 112 mA, for example, the light photon density changes from $4.3\times10^{21}$ to $7.1\times10^{21}$, which correspond to an extinction ratio of 2.2 dB. At the same time, the chirp of the laser is ~12.8 GHz. The required chirp is about half of the bit rate, for example, for 25 Gb/s, the required chirp is ~12.5 GHz. The size of the chirp can be adjusted by adjusting the modulation current amplitude. The output electrical field of laser can be expressed as follows:

$$E(t) = \sqrt{S(t)} \exp\left(j2\pi\left(v_{th}t + \int_{-\infty}^{t}\Delta v(\tau)d\tau\right)\right) \qquad \text{(Eq. 5)}$$

The laser array 12 is coupled to a planar lightwave circuit (PLC) 16 including a plurality of optical spectrum reshapers (OSR) 18a-18d and a wave division multiplexer (WDM) 18. In a preferred embodiment the laser array 12 is butt coupled to the PLC 16, however other coupling mechanisms are possible. The WDM 20 receives signals from the OSRs 18a-18d and multiplexes the signals onto an output fiber 22 using coupling optics 24. In the illustrated embodiment, the laser array 12 couples to one side of the PLC 16 and the coupling optics are coupled to the opposite side of the PLC 16. The illustrated combination of laser array 12 and PLC 16 provides the distinct advantage over the prior art of not requiring a high degree of integration for the laser array 12. The laser array 12 does not require an external modulator as in other WDM transmitters. Furthermore, the OSRs 18a-18d and WDM 20 are passive elements that are readily combined in a single component.

Each OSR 18a-18d receives optical signals from one of the lasers 14a-14d. Each OSR 18a-18d has a transmission edge corresponding to the frequency of the laser 14a-14d from which it receives signals. In some embodiments, the lasers 14a-14d are directly modulated to generate a frequency modulated signal encoding a data signal. In such embodiments, the frequency modulated signal includes frequency excursions between a base and a peak frequency. In a preferred embodiment, a transmission edge of each OSR 18a-18d either includes one or both of the peak and base frequency or lies between the peak and base frequency of the laser 14a-14d from which it receives signals. Each laser-OSR pairing may be embodied as the laser transmitters disclosed in U.S. patent application Ser. No. 11/272,100, filed Nov. 8, 2005 by Daniel Mahgerefteh et al. for POWER SOURCE FOR A DISPERSION COMPENSATION FIBER OPTIC SYSTEM.

The use of OSRs 18a-18d enables the extinction ratio of the light emitted from the lasers 14a-14d to be improved from 1.5 dB before the OSR 18a-18d to 10 dB after the OSR 18. (Matsui Y., et al, Chirp-managed directly modulated laser (CML), IEEE Photonics Technology Letters, Vol. 18, No. 2, January, 2006, pp 385-pp 387).

Figure 2:
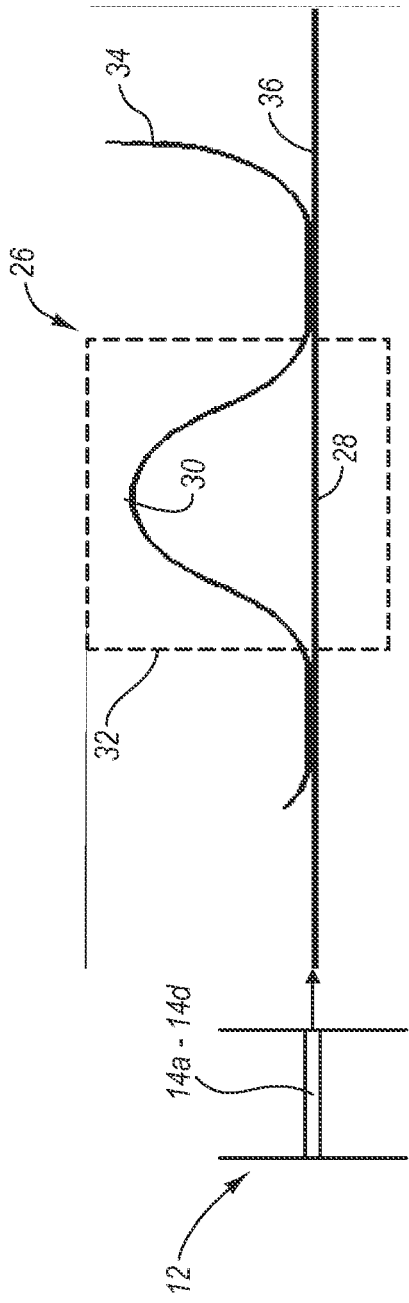
FIG. 2 illustrates an optical spectrum reshaper (OSR) suitable for use in the WDM transmitter of FIG. 1 in accordance with an embodiment of the present invention.

Referring to FIG. 2, while still referring to FIG. 1, in some embodiments, the OSRs 18a-18d may each be embodied as Mach-Zehnder interferometers 26. Each interferometer 26 includes a first path 28 and a second path 30. In the illustrated embodiment, the first and second path 28, 30 are coupled to one another by means of 3 dB couplers at two points. The second path 30 has a longer optical path length between the coupling points. The optical path delay of the second path 30 is preferably equivalent to half of the bit period of a transmitted data signal, for example, if the modulation rate is 25 Gb/s, the optical path delay of the second path 30 is 20-ps. For waveguides based on silicon, which has a refractive index of ~3.5, the optical path difference between the two waveguides would therefore be ~1.7 mm in this example.

A tuning element 32 is coupled to each interferometer 26 in order to alter the optical path length of one or both of the paths 28, 30 to enable alignment of the transmission edge of the interferometer 26 with respect to the wavelength of one of the lasers 14a-14d. The quality of the signal output from the interferometers 26 depends on the frequency detune between a zero-level signal frequency of the frequency modulated output of the lasers 14a-14d and the transmission peak frequency of the interferometer 26. For an input signal having an extinction ratio of ~2 dB, an ER of greater than 10 dB may be achieved after the interferometers 26 with a frequency detune of between 20 and 25 GHz.

The tuning element 32 may alter the optical path length of one or both of the first and second paths 28, 30 by means of the thermo-optic effect, electro-optic effect, or some other mechanism. In a preferred embodiment, each tuning element 32 is a thermoelectric cooler positioned over one of the interferometers 26. In an alternative embodiment, the tuning elements 32 are positioned over the lasers 14a-14d for tuning the wavelengths of the lasers relative to the OSRs 18a-18d The first path 28 has one end positioned to receive light from one of the lasers 14a-14d. The first and second paths 28, 30 further define two output ports 34, 36, respectively, referred to as the bar-port 34 and X-port 36. In the time domain, the output of the Mach-Zehnder interferometer is expressed as in following equations:

$$E_{bar}(t) = \frac{1}{2}\left(E_{in}\left(t - \frac{n_1 L_1}{c}\right) - E_{in}\left(t - \frac{n_2 L_2}{c}\right)\right) \quad \text{(Eq. 6)}$$

$$E_X(t) = \frac{j}{2}\left(E_{in}\left(t - \frac{n_1 L_1}{c}\right) + E_{in}\left(t - \frac{n_2 L_2}{c}\right)\right) \quad \text{(Eq. 7)}$$

where t is time, $E_{in}$ is the input intensity, $n_1$ and $n_2$ are the indexes of refraction for the first and second paths 28, 30, and $L_1$ and $L_2$ are the lengths of the first and second paths 28, 30.

The port 34 of each of the interferometers 26 is coupled to a waveguide 38 transmitting light to the WDM 20. Waveguides 40 are coupled to the waveguide 38 and transmit a fraction, preferably five percent or less, of the light transmitted from port 34 to one edge of the PLC 16. A photodiode array 42 is positioned at the edge of the PLC 16 and includes photodiodes that each receives light from one of the waveguides 38. The ports 36 are coupled to waveguides 44 transmitting light to one edge of the PLC 16. A photodiode array 46 includes photodiodes each positioned to receive light from one of the waveguides 44. In the illustrated embodiment, the photodiode array 42 and 46 are positioned on opposite sides of the PLC 16 and are positioned on faces perpendicular to the face abutting the laser array 12.

The outputs of the photodiode arrays 42, 46 represent light that is transmitted and rejected, respectively, by the interferometers. A driving circuit may be coupled to the photodiode arrays 42, 46 and to the tuning elements 32. The driving circuit may adjust the optical path lengths of one or both of the paths 28, 30 using the tuning elements 32 such that the ratio of the outputs of the photodiode arrays 42, 46 is maintained at a predetermined value, which effectively maintains the position of the transmission edges of the interferometers 26 in a predetermined relationship to the wavelengths of the lasers 14a-14d.

The ratio which gives the best output waveform can be calibrated at the beginning of the life of the laser transmitter 10. For a silicon waveguide, the thermal refractive index coefficient is ~1.8×10$^{-4}$/° C., for a 1.7 mm waveguide. A temperature change of about 5° C. is therefore required to shift the frequency detune of 1 free spectral range (FSR) at 1.55 μm wavelength, or 4° C., to shift the frequency detune of 1 FSR at 1.3 μm wavelength.

Figure 3:
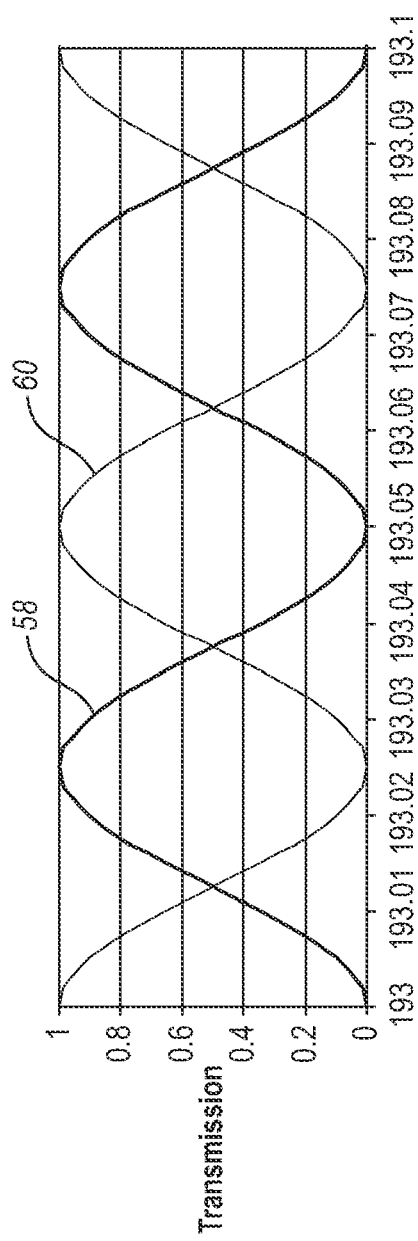
FIG. 3 illustrates that transmission function of a Mach-Zehnder interferometer for use in the multiplexer of a WDM transmitter in accordance with an embodiment of the present invention.

In the illustrated embodiment, the WDM 20 is embodied as cascading Mach-Zehnder interferometers. Other implementations are also possible, such as an etched grating or arrayed waveguide grating. A first stage 48 preferably includes one half of the number Mach-Zehnder interferometers as there are lasers 14a-14d or OSRs 18a-18d. Each interferometer 50a, 50b of the first stage include a first input port 52, a second input port 54, and at least one output port 56. The transmission function for the input ports 52, 54 is shown in FIG. 3, wherein line 58 represents the fraction of light transmitted from the input port 52 to the output port 56 for a given wavelength and line 60 represents the fraction of light transmitted from the input port 54 to the output port 56 for a given wavelength. As is apparent from FIG. 3, the transmission functions have identical free spectral range (FSR) and are offset from one another by one half of the FSR. The FSR of the interferometers in the WDM 20 is controlled by the relative delay of the two waveguides forming the MZ interferometer. For a FSR equivalent to 800 GHz and waveguide refractive index of ~3.5, the optical path difference between the two waveguides of the interferometer is ~27 μm. For a FSR equivalent to 400 GHz the optical path difference between the two waveguides of MZ3 is ~54 μm.

For the illustrated embodiment, the input ports 52, 54 of interferometer 50a are coupled to the OSRs 18a, 18c corresponding to the lasers 14a, 14c emitting at the wavelengths $\lambda_1$ and $\lambda_1 + 2\Delta\lambda$, respectively. The input ports 52, 54 of interferometer 50b are coupled to the OSRs 18b, 18d coupled to the lasers 14b, 14d emitting at the wavelengths of $\lambda_1 + \Delta\lambda$ and $\lambda_1 + 3\Delta\lambda$, respectively. The interferometers 50a, 50b of the first stage have a FSR of $4\Delta\lambda$ and have transmission peaks aligned with the wavelength of the laser from which they receive light.

The output ports 56 of the interferometers 50a, 50b are coupled to input ports 62 and 64, respectively, of one or more interferometers 66 of a second stage 68. The one or more interferometers 66 of the second stage preferably have a FSR equal one half that of the interferometers 50a, 50b of the first stage such that transmission peaks in the second stage 68 are aligned with all of the transmission peaks of the first stage 48.

In the illustrated embodiment, the interferometer 66 of the output stage has input port 62 coupled to the output port 56 of the interferometer 50a and input port 64 coupled to the output port 56 of the interferometer 50b. The interferometer 66 has a FSR of $2\Delta\lambda$ and has transmission peaks through input port 62 at $\lambda_1$ and $\lambda_1 + 2\Delta\lambda$ and through input port 64 at $\lambda_1 + \Delta\lambda$ and $\lambda_1 + 3\Delta\lambda$. The combined first and second stages 48, 58 are therefore able to multiplex the wavelengths of all four lasers 14a-14d onto a single output port 70 of the interferometer 66. The output port 70 is coupled to coupling optics 24 in order to transmit the multiplexed signals over the fiber 22.

Stated generically, a laser array 12 having N lasers $L_0 \ldots L_b \ldots L_{N-1}$ having a wavelength spacing of $\Delta\lambda$ may be coupled to a WDM 20 having $\log_2 N$ stages $S_0 \ldots S_k \ldots S_{log_2 N-1}$, wherein each stage $S_k$ has $N/2^{k+1}$ interferometers $I_0 \ldots I_r \ldots I_{N/2^{k+1}-1}$, each having a FSR of $(N/2^k)\Delta\lambda$ and two input ports $P_{r,1}$ and $P_{r,2}$ and an output port $O_r$. Each interferometer $I_r$ has a transmission peak through input port $P_{r,1}$ at $\lambda_1 + r\Delta\lambda$ and through input port $P_{r,2}$ at $\lambda_1 + (r+N/2^{k+1})\Delta\lambda$.

The input ports $P_{r,1}$ and $P_{r,2}$ of each interferometer $I_r$ in the first stage $S_0$ are positioned to receive light from the OSRs that receive light from lasers $L_r$ and $L_{r+N/2^k}$, which are tuned to wavelengths $\lambda_1 + r\Delta\lambda$ and $\lambda_1 + (r+N/2)\Delta\lambda$, respectively. The input ports $P_{r,1}$ and $P_{r,2}$ of each interferometer $I_r$ in subsequent stages $S_k$ are coupled to the output ports $O_r$ and $O_{r+N/2^{k+1}}$ of the previous stage $S_{k-1}$. The output port $O_0$ of the last stage is positioned proximate an edge of the PLC 16 and is coupled to coupling optics for transmitting the multiplexed optical signals through the fiber 22.

Figure 4:
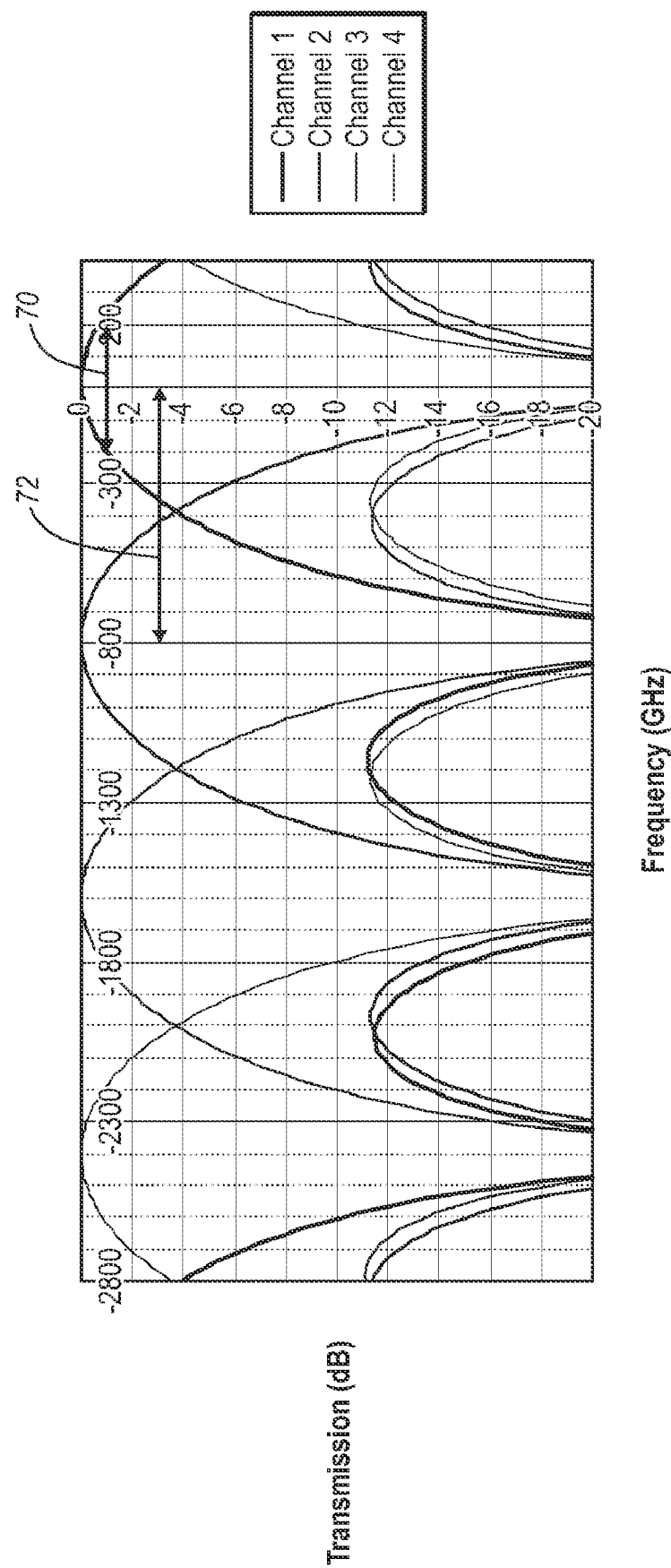
FIG. 4 illustrates that transmission function of the ports of a multiplexer for use in a WDM transmitter in accordance with an embodiment of the present invention.

FIG. 4 illustrates the transmission function for the illustrated WDM 40. The 0.5 dB bandwidth of the peaks of the transmission function of the inputs of the WDM 40 is preferably between 20 and 45 percent of the separation between transmission peaks. As is apparent from FIG. 4, the 0.5 dB bandwidth 70 of the illustrated embodiment is about 40 percent of the wavelength spacing 72, which is 800 GHz in the illustrated example. The wide 0.5 dB bandwidth 70 provides a tolerance of ~+/-160 GHz with respect to the wavelengths of the lasers 14*a*-14*d* and the transmission edges of the OSRs 18*a*-18*d*. In a preferred embodiment, the lasers 14*a*-14*d* have wavelengths lying within the 0.5 dB bandwidth 70 of one of the transmission peaks of the input ports of the WDM 40. The wide 0.5 dB bandwidth 70 facilitates manufacture of a workable WDM transmitter notwithstanding variation in the wavelengths of the lasers 14*a*-14*d* from an equal wavelength spacing.

Figure 5:
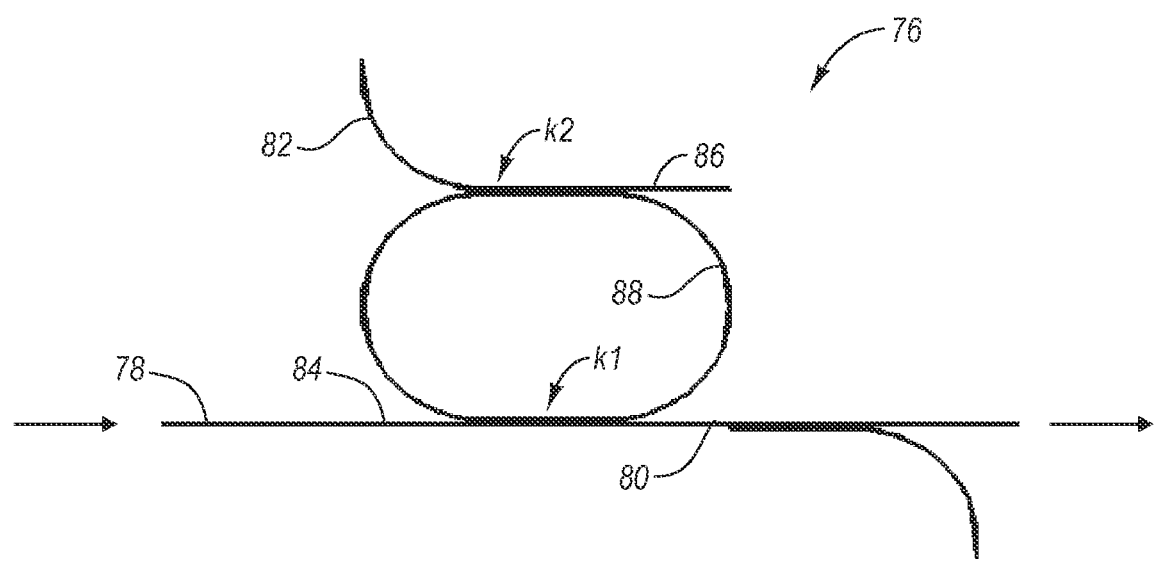
FIG. 5 illustrates a ring resonator suitable for use in the multiplexer of a WDM transmitter in accordance with an embodiment of the present invention.

Referring to FIG. 5, in some embodiments, the Mach-Zehnder interferometers used for the OSRs 18*a*-18*d* may be embodied as ring resonator filters 76 having an input 78, a bar-port 80 and an X-port 82. The bar-port 80 outputs light transmitted by ring resonator filter 76 and is coupled to one of the inputs of the WDM 20 and to the photodiode array 42. The X-port 82 outputs light rejected by the ring resonator filter 76 and is coupled to the photodiode array 46.

The ring resonator filter 76 includes a first waveguide 84, a second waveguide 86, and a ring resonator 88. The ring resonator 88 is coupled to the first waveguide 84 by a first coupler k1 and is coupled to the second waveguide 86 by means of a second coupler k2. The first waveguide is coupled to the input 78 and bar-port 80. The second waveguide 86 is coupled to the X-port 82. The transmission of the bar-port 80 and X-port 82 is described by equation 8 and 9:

$$E_{bar}(v) = \frac{\cos(kL_1) - \cos(kL_2)\exp\left(-\frac{j2\pi nLv}{c}\right)}{1 - \cos(kL_1)\cos(kL_2)\exp\left(-\frac{j2\pi nLv}{c}\right)} E_{in}(v) \quad \text{(Eq. 8)}$$

$$E_X(v) = \frac{\sin(kL_1)\sin(kL_2)}{1 - \cos(kL_1)\cos(kL_2)\exp\left(-\frac{j2\pi nLv}{c}\right)} E_{in}(v) \quad \text{(Eq. 9)}$$

in which, $kL_1$ is the coupling efficiency of coupler k1, $kL_2$ is the coupling efficiency of coupler k2, nL is the optical path delay of the ring 88, and v is the optical frequency of the input field.

Figure 6:
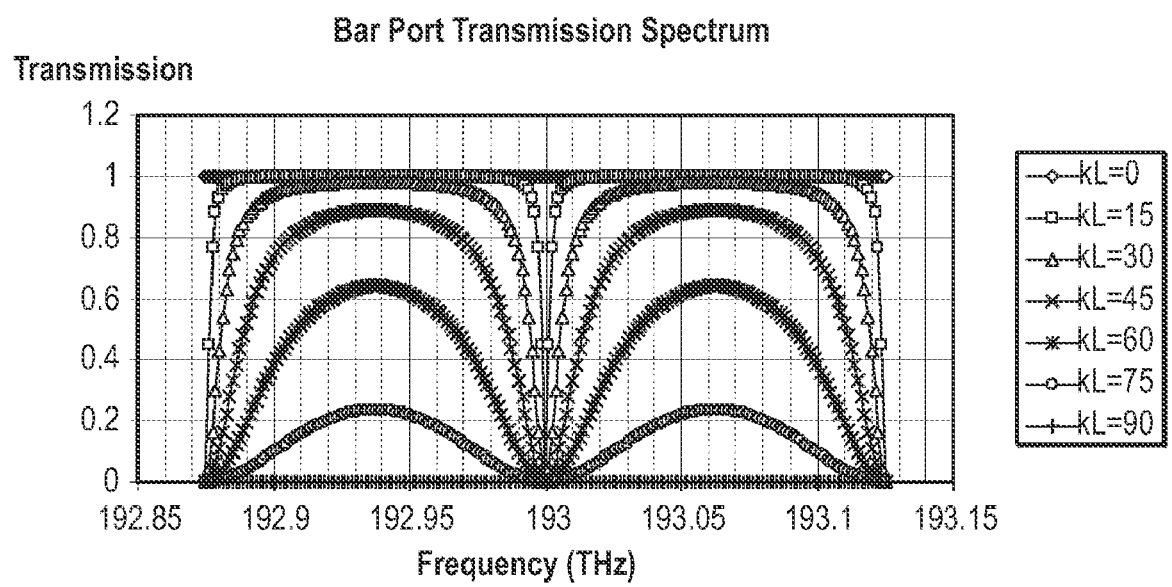
FIG. 6 illustrates the transmission function of a ring resonator for different coupling efficiencies.

FIG. 6 illustrates the transmission spectrum of the bar port 80 for different values of kL, for $kL=kL_1=kL_2$, to maintain the contrasting ratio of the transmission spectrum. The delay of the ring 88 in the example of FIG. 5 is 8 ps. As is apparent from FIG. 5, a ring resonator filter provides the opportunity of optimizing the slope of the OSR by varying the coupling coefficient of the coupler by design.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter comprising;
   a laser array comprising a plurality of frequency modulated lasers each tuned to a corresponding wavelength of a plurality of wavelengths;
   a planar lightwave chip (PLC) abutting the laser array, the PLC comprising:
      a plurality of optical spectrum reshapers (OSRs), each having a transmission edge and each positioned to receive light from one of the plurality of frequency modulated lasers having a corresponding frequency thereof located nearest the transmission edge relative to other frequency modulated lasers of the laser array, wherein each of the plurality of OSRs is adapted to receive input light and to output a transmitted portion and a rejected portion of the input light; and
      an optical multiplexer optically coupled to each of the plurality of OSRs and having an output proximate a first edge of the PLC, the optical multiplexer having transmission peaks each aligned with the corresponding frequency of one of the plurality of frequency modulated lasers of the laser array;
   a first plurality of waveguides each having a first end positioned to receive a portion of the transmitted light from one of the plurality of OSRs and having a second end positioned proximate a second edge of the PLC;
   a first array of photodetectors positioned proximate the second ends of the plurality of waveguides; and
   a second plurality of waveguides each having a first end positioned to receive a portion of the rejected light and a second end positioned proximate a third edge of the PLC;
   a second array of photodetectors positioned proximate the second ends of the plurality of waveguides;
   a plurality of index of refraction adjusting elements each coupled to one of the plurality of OSRs; and
   a controller coupled to the plurality of index of refraction adjusting elements, the first array of photodetectors, and the second array of photodetectors, the controller configured to adjust inputs to the plurality of index of refraction adjusting elements according to outputs from the first and second arrays of photodetectors.

2. The optical transmitter of claim 1, wherein the transmission peaks of the optical multiplexer have a 0.5 dB bandwidth thereof including the corresponding frequency of one of the plurality of lasers of the laser array.

3. The optical transmitter of claim 2, wherein the 0.5 dB bandwidth of the transmission peaks is equal to at least 40% of a frequency separation between the transmission peaks.

4. The optical transmitter of claim 1,
   wherein each of the plurality of OSRs includes first and second waveguides each having an input and an output, the first and second waveguides being coupled to one another at two points between the input and output thereof, the second waveguide having an optical path length between the two points that is longer than the optical path length of the first waveguide between the two points, the output of the second waveguide of each OSR being coupled through a corresponding one of the second plurality of waveguides to the second array of photodetectors and the output of the first waveguide being coupled to the optical multiplexer and through a corresponding one of the first plurality of waveguides to the first array of photo detectors.

5. The optical transmitter of claim 4, wherein the index of refraction adjusting elements comprise thermoelectric coolers.

6. The optical transmitter of claim 1, wherein the OSRs are Mach-Zehnder interferometers.

7. The optical transmitter of claim 1, wherein the multiplexer comprises cascaded Mach-Zehnder interferometers.

8. The optical transmitter of claim 7, wherein pairs of the plurality of OSRs are each coupled to first and second inputs of one of the Mach-Zehnder interferometers of the cascaded Mach-Zehnder interferometers and wherein the OSRs of each pair have transmission edges offset from one another by a frequency difference multiplied by one half the number of lasers in the plurality of lasers.

9. The optical transmitter of claim 1, wherein the multiplexer comprises cascaded ring resonator filters.

10. An optical transmitter comprising:
a laser array comprising a plurality of lasers each tuned to a corresponding frequency of a plurality of frequencies; and
a plurality of optical spectrum reshapers (OSRs) having a transmission edge and being positioned to receive light from one of the plurality of lasers having the corresponding frequency thereof located nearest the transmission edge relative to other lasers of the plurality of lasers; and
an optical multiplexer having a plurality of ports optically coupled to the plurality of OSRs, each port of the plurality of ports having a transmission peak overlapping at least a portion of the transmission edge of the OSRs to which it is coupled, the transmission peaks of the ports having a 0.5 dB bandwidth equal to between 20 and 45 percent of a frequency separation between the transmission peaks.

11. The optical transmitter of claim 10, wherein the transmission peaks of the ports have a 0.5 dB bandwidth equal to at least 40 percent of the frequency separation between the transmission peaks.

12. The optical transmitter of claim 10, wherein the plurality of OSRs and the optical multiplexer are formed on the same planar lightwave circuit (PLC) coupled to the laser array.

13. The optical transmitter of claim 10, wherein the OSRs are Mach-Zehnder interferometers.

14. The optical transmitter of claim 10, wherein the multiplexer comprises cascaded Mach-Zehnder interferometers.

15. The optical transmitter of claim 14, wherein pairs of the plurality of OSRs are each coupled to first and second inputs of one of the Mach-Zehnder interferometers of the cascaded Mach-Zehnder interferometers and wherein the OSRs of each pair have transmission edges offset from one another by a frequency difference multiplied by one half the number of lasers in the plurality of lasers.

16. The optical transmitter of claim 10, wherein the multiplexer comprises cascaded ring resonator filters.

17. A method for transmitting multiplexed optical signals comprising:
directly modulating a plurality of lasers to generate first signals encoding data, wherein directly modulating the plurality of lasers to generate the first signals comprises modulating each of the lasers between a base frequency to a peak frequency to encode a data signal, wherein each laser transmits at a different base and peak frequency;
transmitting the first signals through a plurality of optical spectrum reshapers (OSRs) to generate second signals having an increased extinction ratio relative to the first signals;
transmitting the second signals into ports of an optical multiplexer;
coupling an output of the optical multiplexer to an optical fiber; and
tuning a peak transmission frequency of the plurality of optical spectrum reshapers to be distanced by a preset detune amount from the base frequency of a laser of the plurality of lasers from which it receives one of the first signals;
wherein each of the ports of the optical multiplexer has a transmission peak overlapping at least a portion of a transmission edge of the OSR to which it is coupled, the transmission peaks of the ports having a 0.5 dB bandwidth equal to between 20 and 45 percent of a frequency separation between the transmission peaks.

18. The method of claim 17, wherein transmitting the first signals through the plurality of optical spectrum reshapers to generate second signals having an increased extinction ratio relative to the first signals comprises for each first signal:
transmitting the first signal into a first waveguide;
coupling a portion of the first signal to a second waveguide coupled to the first waveguide at two points and having a longer path length between the two points; and
outputting a first portion of the first signal from the first waveguide.

19. The method of claim 18, further comprising for each first signal:
outputting a second portion of the first signal from the second waveguide and transmitting the second portion to a first array of photodetectors;
transmitting a fraction of the first portion to a second array of photodetectors; and
tuning an index of refraction of at least one of the first and second waveguides according to outputs from the first and second arrays of photodetectors.

20. The method of claim 19, wherein tuning the index of refraction of at least one of the first and second waveguides according to outputs from the first and second arrays of photodetectors comprises controlling the temperature of a thermoelectric cooler positioned over at least one of the first and second waveguides.

* * * * *